3,269,562
PROGRAMMED HANDLING APPARATUS
Frank Richmond Holmes, Darlington, and Armstrong Lincoln Stoddart, Sunderland, England, assignors to Ashmore, Benson, Pease and Company Limited, Stockton-on-Tees, County Durham, England
Filed Mar. 30, 1964, Ser. No. 355,793
Claims priority, application Great Britain, Mar. 30, 1963, 12,714/63
17 Claims. (Cl. 214—14)

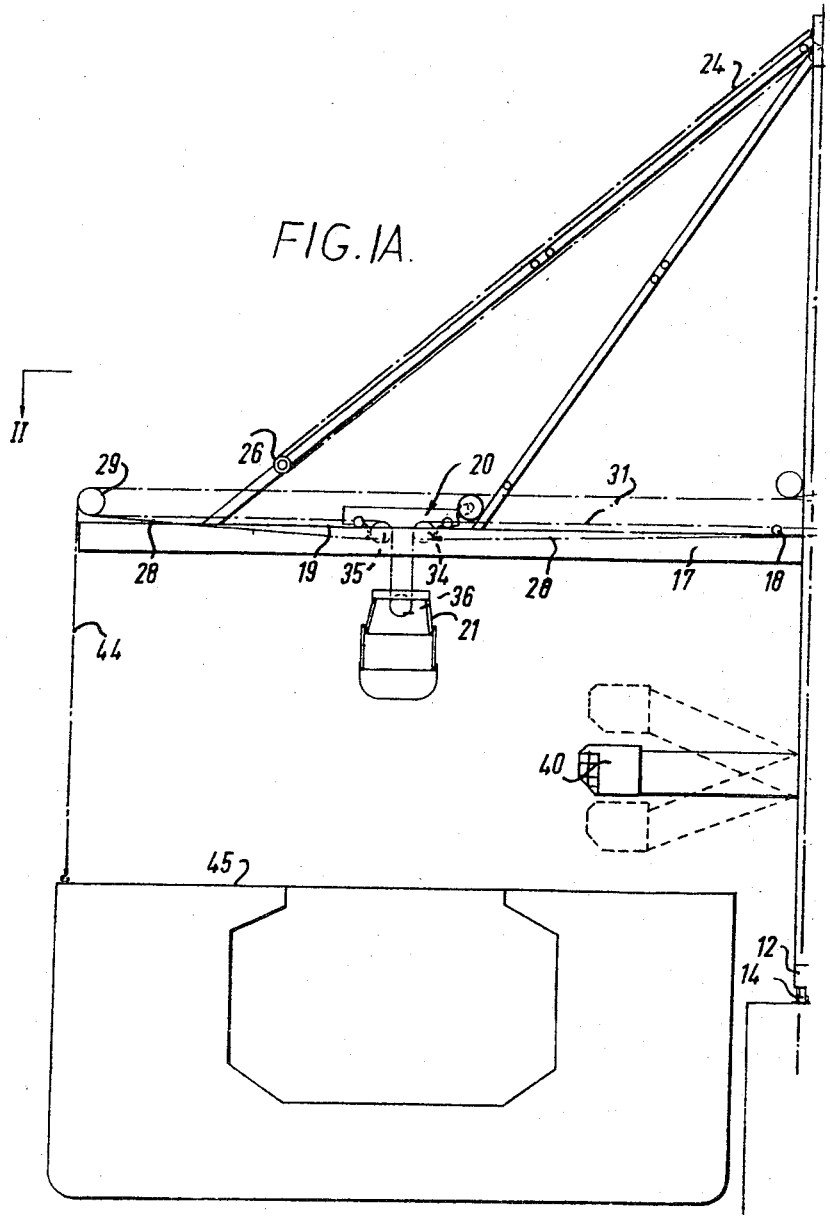

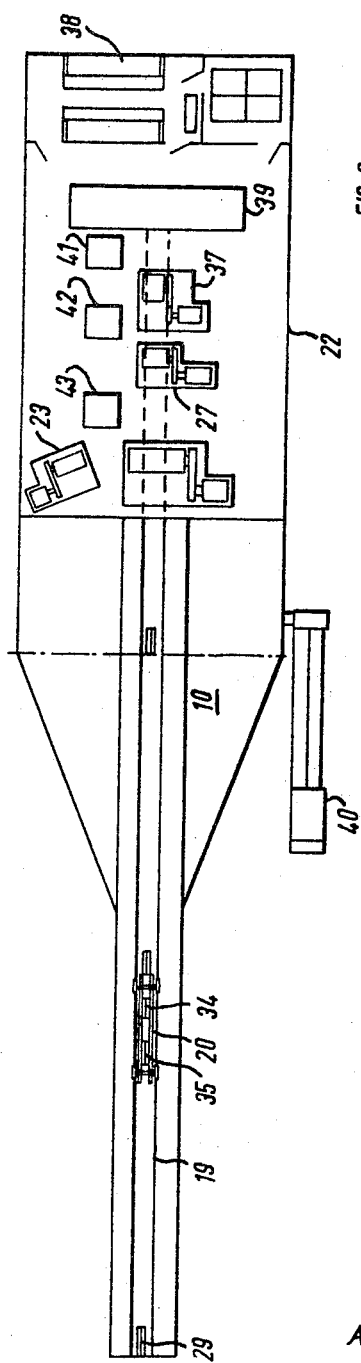

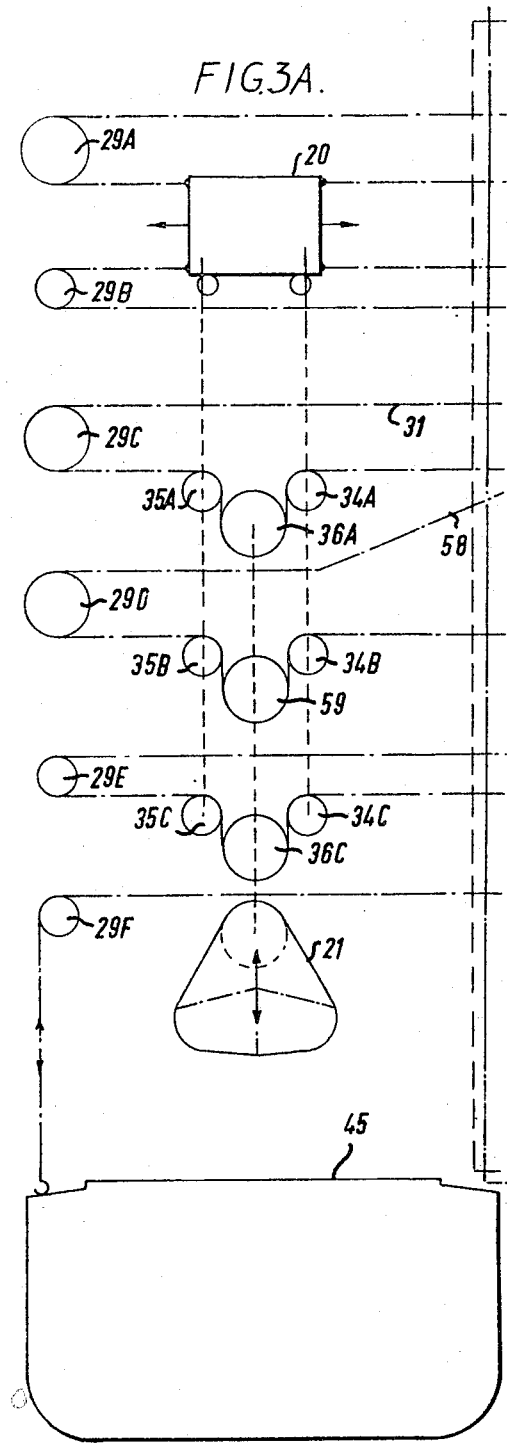

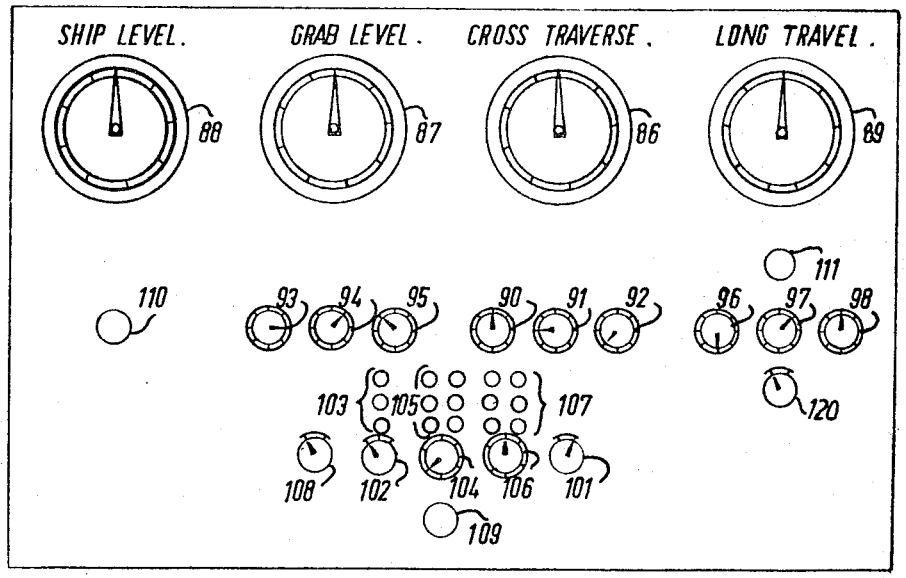
— FIG.4.—

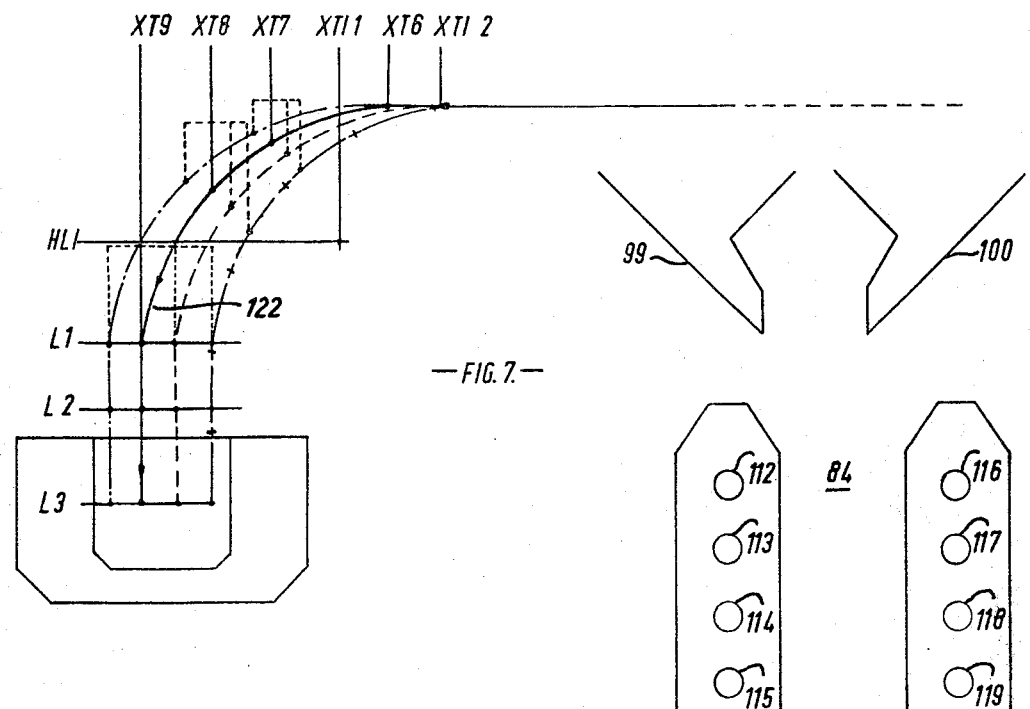

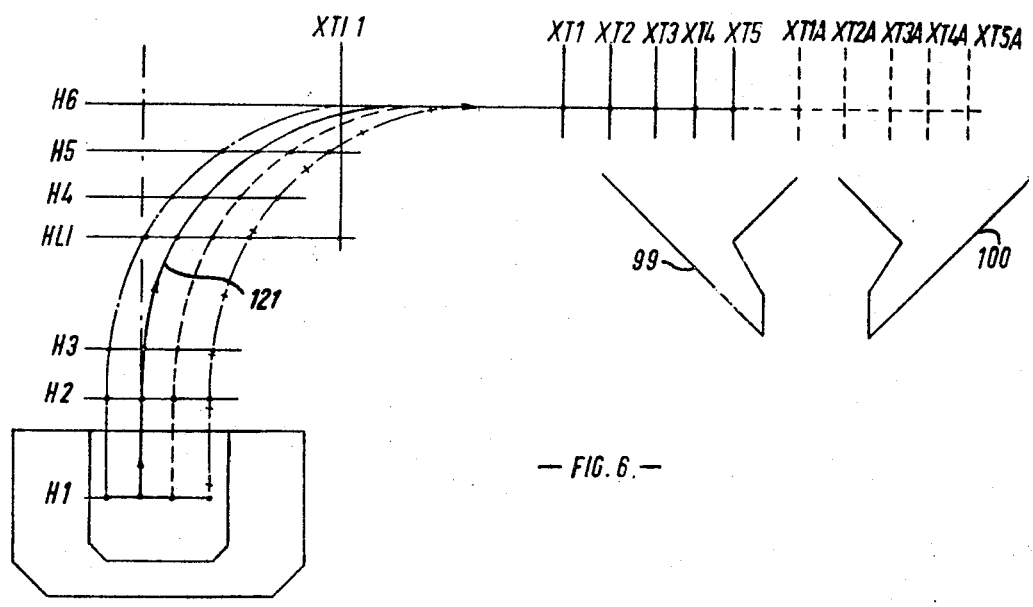
— FIG. 6. —

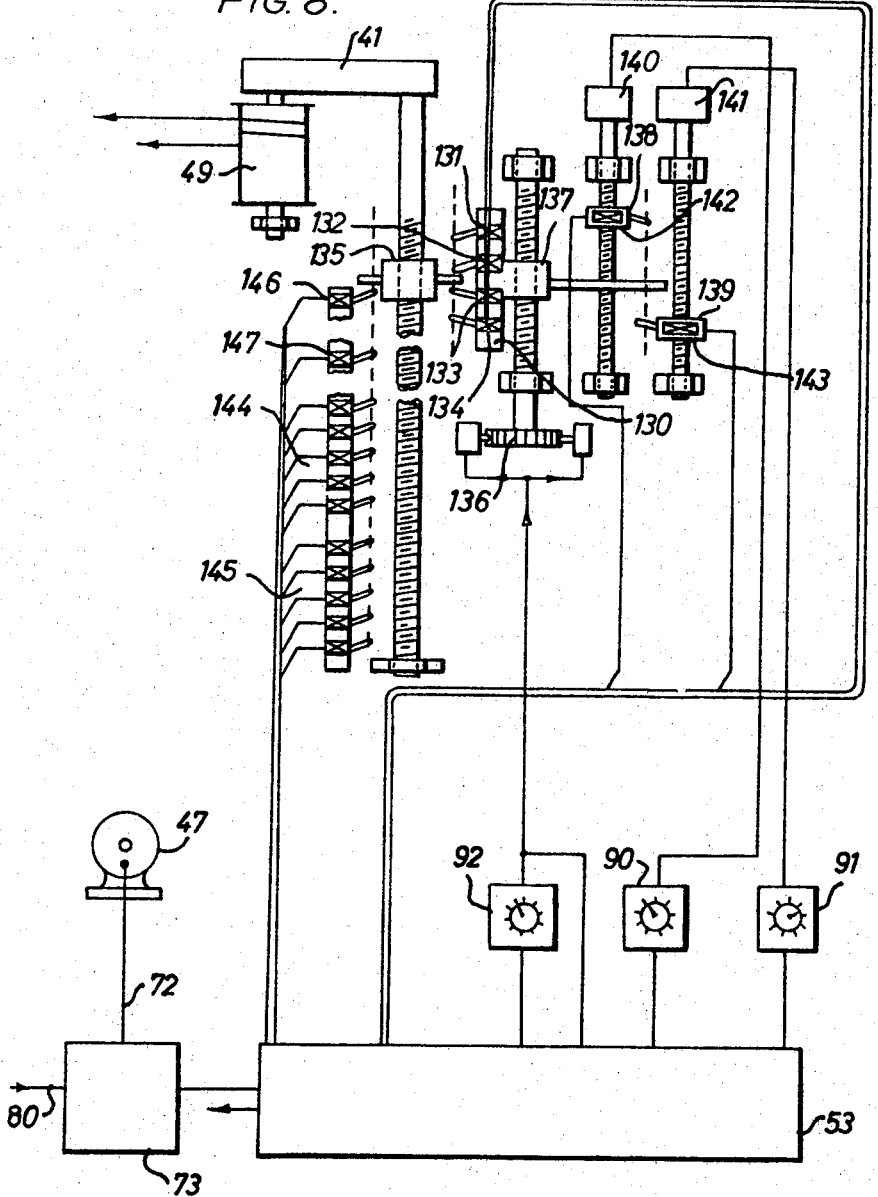

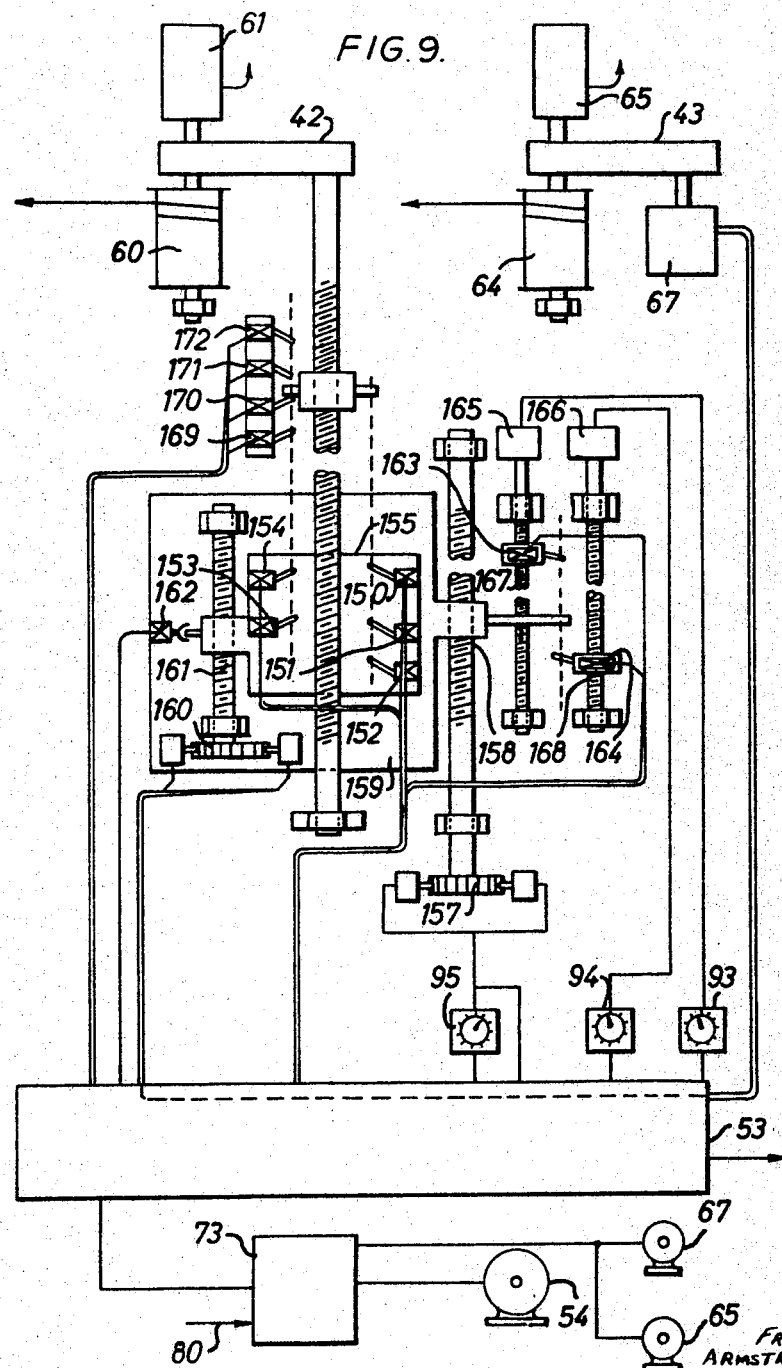

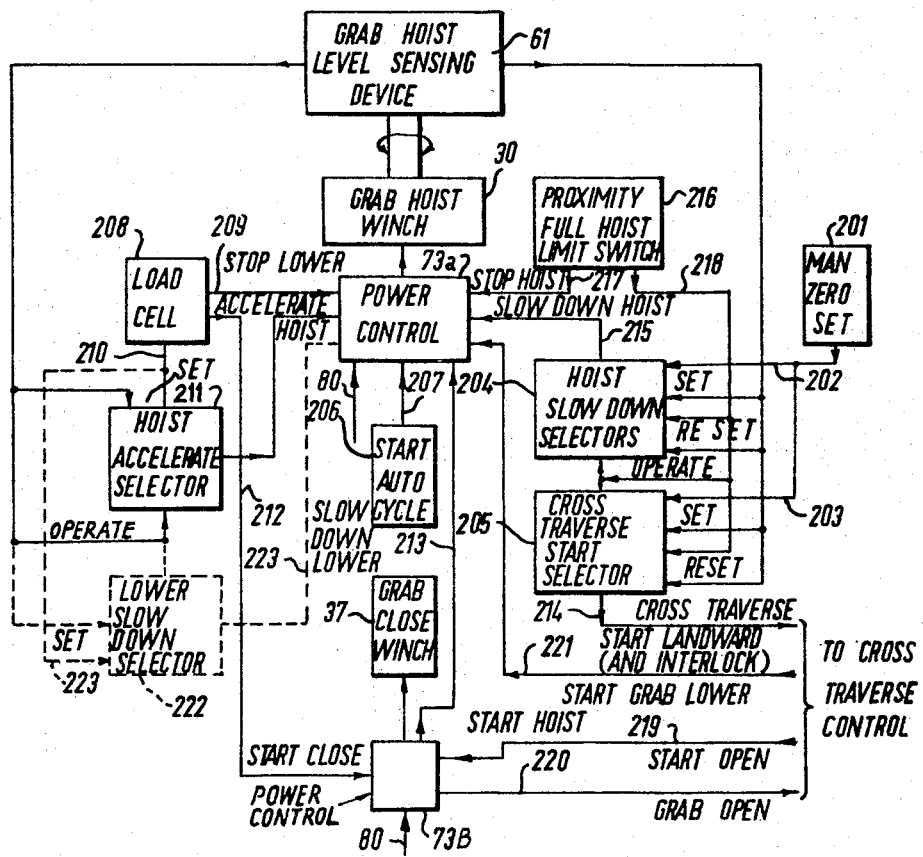
— FIG. 10 —

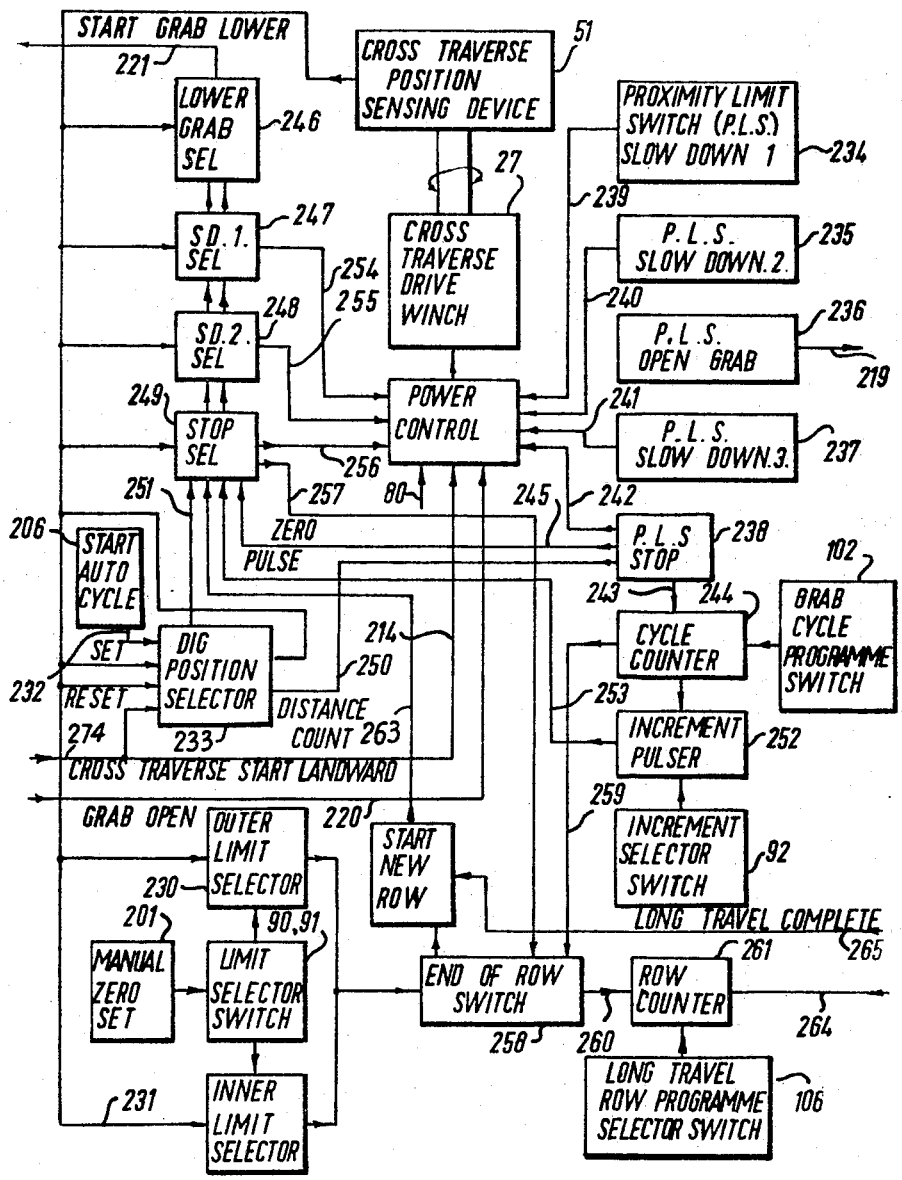
— FIG. 11. —
INVENTORS:
FRANK R. HOLMES
ARMSTRONG L. STODDART
BY
ATTORNEYS United States Patent Office 3,269,562
Patented August 30, 1966

The present invention relates to material handling devices more especially for handling granular solid material, such as ore unloaders or ore bridges.

It is well known to utilize an ore unloader equipped with a grab for moving ore or similar granular material from one location to another, such as from the hold of a ship or from a bunker or stock pile into a discharge hopper for feeding ore transporters such as wagons or into a stock pile. Such ore unloaders are conventionally provided with a hoist for raising and lowering the grab, a secondary hoist for closing and opening the grab, and at least a cross traverse mechanism for moving the grab from one locality to another. In most cases hitherto it has been customary for the drives for the hoists and cross traverse mechanism to be operated under manual control usually in a control cabin. The control cabin may be located on a trolley from which the grab is suspended and which is cross-traversed along a supporting structure and an apron extending therefrom for moving the grab from one locality to another. In such an arrangement the operator has a fairly clear view of the grab at all times. In other arrangements the control cabin is located on the supporting structure upon which, and upon an apron extending therefrom, the trolley from which the grab is suspended, is cross-traversed.

For a given capacity of grab the quantity of ore or other material which can be transported in a given time is very largely dependent upon the speeds at which the drives can be safely operated and upon the skill of the operator and the speed at which the operator can manipulate the controls governing the operation of the unloader. Any demand for increasing the throughput of ore or other material in a given time in a given unloader imposes a greater burden on the operator, and operator fatigue can not only cause throughput fall-off but also creates an attendant risk of careless operation of the controls which, despite adequate safety interlock controls, can result in damage and a serious loss of throughput.

The present invention envisages providing for a measure of automatic operation of a material handling device such as an ore unloader in order to fulfill a preselected programme.

According to one feature of the present invention a method of operating a material handling device such as an ore unloader provided with a grab, a first hoist for hoisting and lowering the grab, a second hoist for closing and opening the grab, and a cross traverse for moving the grab from one location to another comprises preselecting a range of cross traverse positions within an area from which material is to be removed by the grab, selecting an initial reference point within the range of cross traverse, selecting increments of cross traverse, operating the first and second hoists and cross traverse cyclically in a cycle comprising the sequence of closing the grab, hoisting the grab, traversing the grab from within said area to a discharge station, opening the grab, traversing the grab from the discharge station to within said area, lowering the grab, and preselecting a programme control for introducing the increments of cross traverse with preselected cycles until the range of cross traverse has been covered.

When unloading ore from a hold of a ship the range of cross traverse will be selected to be compatible with the breadth dimension of the hold opening. One position of the grab is selected as a reference point or datum from which the range of cross traverse is selected. Such datum can be, for example, the outer side of the hold opening. Preferably a single magnitude of increment of cross traverse is used and this is so selected as to cause the grab to be lowered at a position adjacent its previous position and spaced therefrom appropriate to the amount of material lifted by the grab during each cycle and any tendency of the material to flow when a quantity is removed by the grab.

The sequence in which the increments of cross travel are introduced could be either that the increments of traverse are introduced one after the other with successive cycles until the range of cross traverse or one row has been completed, whereupon either after one cycle, the increments of cross traverse are removed one by one, or are all removed and subsequently, after one cycle, reintroduced one by one. With the cross traverse thus dealt with by a measure of automatic control, it would be up to the operator to control the level at which the grab digs or removes material. Thus it would be possible for the grab to remove material from one level along one row and then remove material from a lower level through the next row, the sequence being then repeated. Alternatively the increments of cross traverse could be introduced after each preselected number of cycles so that the grab could dig a preselected number of times at each cross traverse position within the range, each dig being at a level controlled by the operator.

It is also envisaged that the method may include a measure of automatic control of the level at which the grab digs material. This may be effected by establishing upper and lower levels at which the grab digs and also selecting increments of level which are added according to a preselected programme so that successive digs at the same cross traverse position are at different levels or that all the digs in each successive row are at different levels. Alternatively the level at which the grab digs may be determined by detecting the level at which the grab engages the material.

Thus according to one embodiment, the method includes the steps of preselecting a range of levels to which the grab is to be lowered and at which the grab is to be closed to dig material, selecting an initial reference point within the range of level, selecting increments of level, and preselecting the programme control for introducing the increments of level with preselected cycles.

The sequence in which the increments of level are introduced is preferably related to the sequence in which the increments of cross travel are introduced. Thus the level may remain constant throughout each row of cross traverse and an increment of level introduced after the completion of each row, so that the grab would dig at one level throughout one row of cross traverse and then dig at a lower level throughout the succeeding row. The increment of level could, however, be introduced successively whilst the cross traverse remained constant until the range of level had been completed, whereupon the level would be re-set to its starting level, one increment of cross traverse introduced and the increments of level then introduced one after the other until the range of level had been completed again. Yet again the programme may include any combination of sequence of increments of level and increments of traverse to cover any desired pattern.

In a preferred arrangement povision is made for preselecting the number of cycles, for example up to three, to be effected before any increment of level is introduced and thereafter before any subsequent increment is introduced thereby enabling the grab to dig, if desired, repeatedly at the same cross-traverse position and at the same level. It is convenient for each increment of level to be introduced after a row of cross traverse has been completed, and preferably provision is made for preselecting the number of rows, for example up to six, to be completed before any increment of level is introduced or between the introduction of successive increments of level.

According to another embodiment, the method includes the steps, during that part of each cycle in which the grab is lowered, of detecting a reduction in load on the first hoist occasioned by the grab engaging the material and arresting the lowering of the grab substantially at that level. Thus in this embodiment the grab can be regarded as finding substantially automatically its own level at which to dig and the programme need not be preselected to determine the cycles in which increments of level are introduced and need only cater for varying the number of cycles at each cross traverse position in each row.

Provision is also made for long travel of the ore unloader, that is to say in a direction substantially at right-angles to the direction of cross traverse and either embodiment of the method, therefore, also preferably includes the steps of preselecting a range of long travel, selecting an initial reference point within the range of long travel, selecting increment of long travel, and preselecting a progarmme control for controlling the operation of the long travel by successive increments from the reference point in sequential relationship with the introduction of increments of cross traverse in a preselected programme.

When unloading ore or like material from the hold of a ship the range of long travel would be selected so as to be compatible with the fore and aft length of the hold opening and preferably one end, either the fore or aft end of the hold opening, would be selected as the reference or starting point. Preferably a single magnitude of increment of long travel is used and this is so selected that each successive position of the ore unloader would be adjacent its previous position and spaced therefrom by a distance appropriate to the dimensions of the grab and any tendency for the ore or material to flow when a quantity is removed by the grab.

It is preferable for as many rows of cross traverse as practically possible to be completed before any long travel takes place, since long travel is a relatively slow time consuming operation, often necessitating raising and lowering of an apron on which the trolley runs. In a preferred arrangement provision is made of preselecting the number of rows, for example up to six, to be completed before any long travel is effected, or between any succeeding increments of long travel.

The present invention also includes apparatus for performing the method and thus according to another feature of the invention a control system for automatically operating a material handling device, such as an ore unloader, having a grab, a first hoist for hoisting and lowering the grab, a second hoist for closing and opening the grab, a cross traverse drive for moving a shipward direction to a position above a hold of a ship and in a landward direction to a discharge position, along a trolley supporting track, a trolley from which the grab is suspended, comprises cross traverse position means responsive to the position of the trolley along the trolley supporting track, selector switch means for selecting inner and outer limit positions of the trolley in the shipward direction, increment selector switch means for selecting increments of cross traverse for the trolley, cyclic control means for operating said first and second hoists and said cross transverse drive in a succession of cycles, each comprising operating said second hoist to close the grab, operating the first hoist to hoist the grab, operating the cross traverse drive to move the trolley in a landward direction to bring the trolley to said discharge position, operating said second hoist to open the grab, operating the cross traverse drive in the shipward direction to bring the trolley into a position above the hold of a ship, and operating the first hoist to lower the grab limit control means responsive to the cross traverse position means and to said selector switch means for arresting the cross traverse drive in the shipward direction and responsive to programme control means and to said increment selecfor switch means for determining the position of arrest of the cross traverse drive and thereby enable the grab to dig material from the hold in preselected programme of positions.

In practice it is not possible for all the material in a ship hold to be removed by an ore unloader grab operating across a single region in the fore and aft direction of the ship and from time to time repositioning of the grab relatively to the ship in the fore and aft direction is necessary. This can be most conveniently achieved by moving the ore unloader along the quayside relatively to the ship. Such long travel of the ore unloader can be effected under manual control but it is envisaged that it can form part of the preselected programme. Thus for controlling long travel drive of the unloader, the control system preferably includes long travel position means responsive to the long travel position of the unloader, selector switch means for selecting limits of long travel, increment selector switch means for selecting increments of long travel, and long travel control means responsive to said programme control means and to said long travel limit selector switch means and to said long travel increment selector switch means and to said long travel position means for starting and determining the position of arrest of the long travel drive within the predetermined programme.

The selector switch means and the increment selector switch means may conveniently be grouped together on a presetting panel and in order to facilitate their adjustment by an operator there is preferably included in the panel display means giving visual indications of the level of the grab relatively to the track, the level of the ship relatively to the track, the position of the trolley along the track and the long travel position of the ore unloader.

Whilst the stopping of the first hoist when lowering the grab can remain under manual control of an operator who would thus determine the level at which the grab would dig into material in the hold, the control system preferably includes devices for automatically controlling the level of arrest of the first hoist when lowering the grab. In one embodiment of the invention the control system includes grab level position means responsive to the level of the grab relatively to the trolley supporting track, selector switches means for selecting high and low level limit positions of the grab relatively to the track, increment selector switch means for selecting increments of level of the grab, limit control means responsive to the grab level position means and to the high and low level limit position selector switch means for arresting the first hoist in a grab lowering direction and responsive to said programme control means and to said increment selector switch means for determining the level of arrest of the first hoist and thereby enable the grab to dig material from the hold in a preselected programme of positions.

Since the level of the ship may alter relatively to the track due to either or both the reduced draught resulting from unloading and tidal variations, the actual level of the grab relatively to the track in order to achieve a preselected effective level of the grab relatively to the material in the ship may vary commensurately. In order to permit compensation of the level of the grab, the control system preferably includes ship level position means responsive to the level of the ship relatively to the track, and said limit control means for determining the level of arrest of the first hoist during a grab lowering operation is also responsive to the ship level position means.

In order to set up a programme it is convenient for an operator to first position the ore unloader by its long travel so that the line of the trolley track lies above the area of a ship hold opening and adjacent either the fore or the aft end thereof, and then to position the grab in one corner of the hold, preferably an outer corner, and at a level at which the grab will dig into the upper level of material in the hold. For this purpose manual control means, conveniently on the form of push button operated switches, is preferably provided adjacent the panel. The position of the ore unloader, the trolley and the grab will then be displayed on the panel, and from the display and knowledge of the dimensions of the hold opening and the depth of material in the hold, the selector switch means can be set to determine the limiting position. The increment selector switch means can then be set as believed by the operator to be appropriate. The panel also preferably includes selector switch means for establishing the programme to be executed, such as the number of cycles to be effected before any change in position or level, the number of rows to be effected before any change in level, the number of rows to be completed at one longitudinal position before a long travel movement to an adjacent long travel position where any succeeding rows are effected, and the direction of long travel movement. Provision may also be made for selecting which of two or more discharge positions of the trolley is to be used. When such selecting switch means have been operated a programme start push button operated switch can be operated and the progress of the programme can be observed from movement of the grab, from the indicators and, if desired, from pilot lights on the panel.

In another embodiment of the invention the control system includes means responsive to a reduction of load on the first hoist during a grab lowering when the grab engages and is supported by material and control means responsive to a signal from the load reduction responsive means for arresting the first hoist during a grab lowering operation. The load reduction responsive means may comprise a load cell: such cell may be included in an anchorage for one end or ends of the rope or ropes used for hoisting and lowering the grab.

In this embodiment the grab effectively finds its own level for digging material and it is not necessary to provide selector switch means for preselecting the high level and low level limit positions, nor for selecting any increment of grab level, nor to provide compensating devices to allow for changes in ship level. Selector switch means and increment selector switch means for the cross traverse and long travel are, however, required as in the first embodiment, together with display means giving visual indication of the position of the trolley along the track and the long travel position of the ore unloader. Visual indications of the level of the grab and the level of the ship relatively to the track may be included, if desired.

In order to set up a programme it is convenient for an operator to first position the ore unloader by its long travel, and then by its cross traverse, under manual control, to bring the grab into a position over one corner region of a hold in a ship, but as the grab will find its own level it is not necessary for the grab to be initially lowered into contact with the material in the hold. On the presetting panel the cross traverse position of the trolley and the long travel position of the ore unloader will be displayed and the selector switch means can be set to determine the limiting position and the increments of cross traverse and of long travel generally as hereinbefore described. Since the grab digging level is determined automatically by the action of the load cell, no preselecting of the programme in respect of grab level is required and it is only necessary to preselect the number of cycles to be effected before the first and any subsequent introduction of cross traverse increment and to preselect the number of rows to be effected before the first and any subsequent increments of long travel, before operating the programme start push button operated switch.

In any embodiment the position means responsive to the cross traverse position of the trolley and the level of the grab, may be driven mechanically from the cross traverse drive winch and the grab hoist winch respectively. Since the drives from the winches to the trolley and the grab are by means of ropes there is an attendant risk of inaccuracy as a result of variation in rope tension and stretch and, especially in the case of the cross-traverse drive for which opposite ends of each rope are secured to the opposite ends of the trolley whilst an intermediate part of the rope passes two or more times round its winch drum, of slip occurring between the drive ropes and the winch drums. Compensation can to some extent be made for this by arranging to reset each position means to an arbitrary zero or other reference value one in each cycle: the grab position means, for example, when the grab is fully hoisted, and the cross traverse position means, for example, when the trolley is in a discharge position. Alternatively such attendant risk of inaccuracy can be at least reduced by providing independent control ropes for the trolley for driving a drum associated with the cross traverse position means. The grab level, and the ship level position means, where provided, may each include a winch drum to which one end of an independent control rope is attached and upon which a torque motor acts.

In any embodiment the position means responsive to long travel position of the ore unloader, to the cross traverse position of the trolley, to the level of the grab, to the level of the ship, can each comprise a plurality of position switches operated mechanically, for example by screw and nut mechanisms or tappets, or by servo-mechanisms or correspondence control devices such as selsyns, or can comprise multi-position, single or multi-pole switches, or can each comprise a digitizer or device expressing position in digital form such as electrical signals in, for example, a multi-element binary code. Where a digitizer is used in connection with the long travel position, provision may be made for utilizing the initial set-up position of the ore unloader as an arbitrary zero. Each of the limit selector switch means and of the increment selector switch means can express a desired position or increment in the form of electrical signals in the same multi-element binary code and the limit control can include digital computers embodying stores, adders and comparators for determining the arrest of the hoists and cross traverse and long travel drives.

Where multi-position switches are used the limit control can alternatively comprise a plurality of multi-bank electromagnetically operated stepping switches such as uni-selectors, motor selectors, or reversible rotary selectors, in conjunction with stepping circuits or pulse generators, marker circuits and relays and switching circuits.

By means of the present invention it is possible to preselect the sequence and cycles of operation of the ore unloader to enable the major part of the contents of a hold of a ship to be unloaded automatically by the ore unloader without the continuous manual operation of controls by an operator. Once the programme has been preselected and the ranges of cross traverse, and long travel (and grab level when necessary) have been preselected, together with the increments of cross traverse and long travel (and grab level when necessary), and operation initiated, no further action by the operator is normally necessary until the sequence has been completed; thereafter manual control can be adopted in order that any remaining ore or material can be removed by the grab.

The invention will be further described by way of example with reference to the accompanying drawings, in which:

FIGS. 1A and 1B are a partially diagrammatic side elevation of an ore unloader of the type including a grab, a supporting structure, an apron extending therefrom and an operator's cabin carried by the supporting structure, showing a quayside and part of a ship;

FIG. 2 is a partially diagrammatic plan view along the line II—II of FIG. 1 with certain parts removed for the sake of clarity;

FIGS. 3A and 3B are a block diagram of the power drives and control system of the ore unloader of FIG. 1 according to one embodiment of the invention, including a presetting and indicating panel and manual controls;

FIG. 4 is an elevation of the presetting and indicating panel of FIG. 3;

FIG. 5 is an illustration of the manual controls of FIG. 3;

FIG. 6 is a diagram illustrating the path of the grab from inside the ship hold to a discharge position;

FIG. 7 is a diagram illustrating the path of the grab from the discharge position to inside the ship hold;

FIG. 8 is a diagrammatic plan view of one form of electro-mechanically operated limit control for the cross traverse suitable for the control system of FIG. 3;

FIG. 9 is a diagrammatic plan view of one form of electromechanically operated limit control for the grab hoist suitable for the control system of FIG. 3;

FIGS. 10 and 11 are block schematic diagrams of parts of another form of control system according to another embodiment of the invention.

Figure 1B:
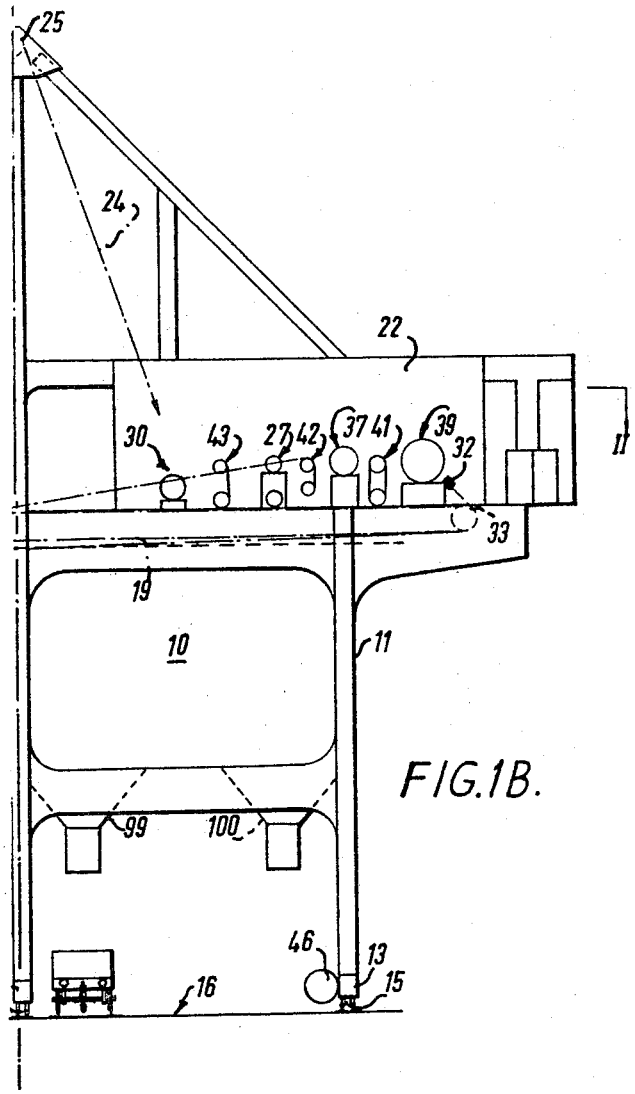

Referring initially to FIGS. 1 and 2, an ore unloader indicated generally at 10 includes a main supporting structure 11 having four sets of wheels of which only two, 12, 13 are shown, running on rails 14, 15 on a quayside 16. Extending in a shipward direction from the supporting structure 11 is an apron 17 hingedly connected thereto about hinge pins 18. A track 19 extends over the apron and on to the supporting structure 11 to carry a trolley 20 from which is suspended a grab 21. At the landward end of the supporting structure 11 is a machinery house 22, containing an apron winch 23 for raising the apron by means of rope 24 running over sheaves 25 at the top of the supporting structure and sheaves 26 attached to an outer region of the apron. The machinery house 22 also contains a winch 27 for cross traversing the trolley 20 along the track 19 by means of rope 28 passing around one of a group of sheaves 29, at the outer end of the apron 17. Hoisting of the grab 21 is effected by a grab hoist winch 30 in the machinery house 22 by means of rope 31, one end of which is anchored at 32 and which passes around one of a group of sheaves 33 on the support structure 11, one each of groups of sheaves 34, 35 on the trolley, one of a group of sheaves 36 on the grab 21 and one of the group of sheaves 29. Opening and closing of the grab is effected by winch 37 by means of a rope passing around a sheave in each of the groups 33, 34, 35, 29 and a further sheave 59 (not shown in FIG. 1) on the grab 21, and having one end secured to a drum of the winch 37 and the other end secured to a drum of the grab hoist winch 30. The machinery house 22 also contains electrical control equipment 38 and a motor generator set 39. The supporting structure 11 also carries an operator's cabin 40. The cabin may be movable vertically as indicated in FIG. 1 or may be movable in a shipward-landward direction.

For detecting the position of the trolley 20 there is provided, in the machinery house, cross traverse position means 41 linked to the trolley 20 by a rope independent of rope 28 for cross traversing the trolley. Grab level position means 42 in the machinery house 22 is linked to the grab by a rope which follows generally the same path as rope 31 but is independent thereof. There is also provided in the machinery house 22 ship level position means 43 which is linked to a rope 44 passing over one of the group of sheaves 29 at the end of the apron and having at its end a weight and/or means for attachment to or engagement with a part of a ship indicated diagrammatically at 45. The supporting structure 11 also includes long travel position means 46 associated with one of the sets of wheels running on the rails.

The position means are indicated in greater detail in FIG. 3 to which reference will now be made, and in which the various winches and drives and controls therefor are illustrated diagrammatically. The cross traverse winch 27 includes a drive motor 47 and winch drum 48 around which is wound the rope 28 of which the ends are attached to the trolley 20. The cross traverse position means 41 includes a drum 49 around which is wound a rope 50 having its ends also attached to the trolley 20. Rotation of the drum 49, as a result of movement of the trolley 20, actuates a cross traverse position sensing device 21 producing signals extended over leads 52 to a programme and limit controller 53. The grab hoist winch 30 includes a drive motor 54 and a grab hoist drum 55. The rope 31 has one end anchored at 32, passes around sheave 34A in the trolley 20, around sheave 36A in the grab 21, around sheave 35A in the trolley 20 and around sheave 29C at the end of the apron, and has its other end attached to the winch drum 55. The grab closing winch 37 includes a drive motor 56 and a winch drum 57 to which is attached one end of rope 58 which passes around sheave 34B in trolley 20, sheave 59 in the grab 21, sheave 35B in the trolley 20 and sheave 29D at the end of the apron, and has its other end attached to the winch drum 55 of the grab hoist winch 30.

Grab level position means 42 comprises a drum 60 which is mechanically connected to a torque motor 61 and to which is attached one end of rope 62 which passes around sheave 29E at the end of the apron, around sheave 35C in trolley 20, around sheave 36C in the grab 21, around sheave 34C in trolley 20 and has its other end anchored at 63. Each of the sheaves 34A, 34B, 34C, 35A, 35B and 35C are, it will be understood, on the trolley 20 but for the purposes of illustration they have been shown separately therefrom; likewise each of the sheaves 36A, 59, 36B are on the grab 21, but for the purposes of illustration they have been shown separate therefrom. Similarly all the sheaves 29A, 29B, 29C, 29D, 29E, 29F are at the end of the apron, but these have been separated from one another for the purpose of clarity. The ship level position means 43 comprises a drum 64 connected to a torque meter 65 and having attached thereto one end of the rope 44 which passes over sheave 29F and is attached to or otherwise engaged with part of the ship 45. Each of the level position means 42, 43 includes a position sensing device 66, 67 respectively, connected by leads 68, 69 to the controller 53. The torque motors 61, 65 are connected by leads 70, 71 to a power control 73 to which the drive motors 47, 54, 46 are also connected by leads 72, 73A, 74. The long travel of the ore unloader is effected by a drive motor 75 mechanically connected to some of the sets of wheels 12, 13. In order to avoid inaccuracy in position as a possible result of wheel slip it is envisaged that the drive is only extended to three of the sets of wheels designated 12A, 12B and 13A, and that the fourth set of wheels designated 13B is connected to a long travel position means indicated generally at 76 and including a position sensing device 77 connected by lead 78 to the controller 53. The motor 75 is connected by leads 79 to power control 73 to which an electricity supply is extended on line 80.

The power control 73 is connected to the controller 53 through leads 81 and the controller 53 is connected over the leads 82 to a pre-setting and indication panel 83 with which is associated a group of manually operable controls 84. The panel 83 and the manual controls 84 are preferably located in the operator's cabin 40 whilst local manual control 85 may conveniently be provided in the machinery house 22 for maintenance purposes.

One form of the pre-setting and indication panel 83 is illustrated in FIG. 4 and includes four display indicators 86, 87, 88, 89, for providing a visual indication of the cross traverse position of the trolley 20, the level of the grab 21, the level of the ship 45 and the long travel position of the ore unloader 10. For each of these a suitable location must be selected as datum; for the cross traverse position of the trolley an outer end of the apron is a convenient datum. The level of the track 19 on which the trolley 20 runs is a convenient datum for the grab level and for the ship level, the levels of the grab and ship being indicated in a positive sense in the downward direction. Each of the display indicators may be driven mechanically from the corresponding position sensing device 47, 66, 67, 77 by a mechanical drive such as a Bowden cable or may be driven through servo mechanisms or correspondence control devices such as selsyns.

Associated with the cross traverse position of the trolley are an outer limit position selector switch 90, an inner limit position selector switch 91 and an increment selector switch 92, each in the form of a multi-position switch having an operating pointer knob co-operating with an appropriate calibrated scale such as 0 to 20 feet, 20 to 50 feet, 1 to 5 feet respectively. Associated with the grab level is a high level limit position selector switch 93, a low level limit position selector switch 94 and increment selector switch 95 suitably calibrated, for example 40 to 60 feet, 60 to 90 feet, 1 to 5 feet respectively. Associated with the long travel position indicator 89 are two limit position selector switches 96, 97 and an increment selector switch 98 each suitably calibrated. The increment selector switch 98 may, for example, be calibrated 5 to 20 feet. If two or more hoppers, such as 99, 100 are provided on the supporting structure 11, and these may be used selectively, a selector switch 101 is provided for selecting the hopper to be used, since the position of the trolley when the grab is open to discharge material will depend upon the hopper to be used.

Whilst provision can be made for selecting one of several patterns to be followed by the grab in unloading a ship's hold, it is believed to be convenient to provide for a single basic pattern, but to provide for the number of cycles of grab hoisting and the number of rows of trolley cross traverse between changes of level at which the grab digs and changes of cross traverse position at which the grab digs, to be varied. For the purpose of illustration the panel illustrated in FIG. 4 is suitable for a programme in which the grab digs at the same level along each row, in which the digs of the grab in each row in the same order, i.e. from the outer limit position to inner limit position, and in which long travel movement, only takes place at the end of a row. Selector switch 102 provides for selecting the number of digs to be made by the grab at each position of cross traverse before any change is made in the cross traverse position; the switch 102 may be calibrated 1 to 3 and pilot lights 103 may be provided to indicate whether the grab is making its first, second or third dig at a given cross traverse position. Selector switch 104 permits selection of the number of rows to be completed before the introduction of a change in level at which a grab digs; switch 104 may be calibrated for example 1 to 6, and pilot lights 105 give an indication of which row is in progress. Selector switch 106 permits selection of the number of rows required to be completed at any one long travel position before a long travel movement to an adjacent long travel position at which any succeeding rows are effected; switch 106 may be calibrated for example 1 to 6 and pilot lights 107 indicate which row is in progress. A further selector switch 120 permits selection of the direction of long travel movement of the ore unloader. A selector switch 108 is provided for selecting automatic or manual control. Two push button operated switches 109, 110 are provided for initiating the start of an automatic programme and for emergency stop respectively.

Should the position sensing device 77 associated with the long travel position be in the form of a digitizer, it is convenient to regard the first or initial setup position of the ore unloader as a zero reference position and for this purpose a long travel zero set push button operated switch 111 may be provided.

One form of manual control 84 is illustrated diagrammatically in FIG. 5 and comprises two four-way push button stations. Push button switches 112, 113 control the motor 47 for driving the trolley inward or landward and outward or shipward respectively; push button switches 114, 115 control the drive motor 75 for effecting long travel in one direction and in the other direction respectively; push button switches 116, 117 control operation of the motor 54 to hoist and lower the grab respectively; push button switch 118 controls the operation of drive motor 56 for opening and closing the grab as appropriate, whilst push button switch 119 is an emergency stop switch.

It is believed that the inter-relationship of the selector switches on the panel 83, the controller 53, the power control 73 and the position responsive means can be best understood with reference to a programme. Let it be assumed that a ship 45 has been berthed alongside the quayside 16. For the sake of description let the direction of the quayside be referred to as the north/south direction. The ore unloader 10 is moved under manual control by an operator until it is in a position in which the apron would extend over the opening of a hold; the apron is then lowered by operation of the apron winch hoist 23. By operation of the long travel drive, cross traverse and grab hoist winches, as a result of operation of the push button switches in the manual control 84, the grab is located in the open condition in engagement with material inside the hold and at one corner of the hold, for example the outer north corner of the hold. It is not essential for the long travel position of the ore unloader to be indicated over the whole length of possible long travel, since indication over the greatest length of a ship's hold over which the ore unloader may be required to operate will suffice. Provision may, therefore, be made either for rendering the long travel position sensing device 77 inoperative during initial positioning movement of the ore unloader under manual control or at least for resetting it with respect to an arbitrary datum after initial positioning of the ore unloader. A long travel zero set push button operated switch 111 on the panel 83 can be utilized for this purpose. The long travel position of the ore unloader is then displayed by the indicator 89 and one limit position selector switch 96 can then be set by the operator to a calibration mark corresponding to that displayed by the indicator 89. From his knowledge of the fore and aft measurement of the hold opening, and the dimensions of the grab 21, the operator can set the other limit position selector switch 97 to a calibration appropriate to the position desired to be occupied by the grab in the long travel direction at the other end of the hold opening. The operator can decide how many steps of long travel he deems necessary and then the magnitude of each long travel increment and set the increment selector switch 98 to the appropriate calibration. He will also set the selector switch 120 to the direction of long travel movement desired.

In a similar manner the indicator 86 will display the cross traverse position of the trolley and the outer limit selector switch 90 can be set by the operator to the calibration mark corresponding to that displayed by the indicator 86. From his knowledge of the side to side dimension of the hold opening and the dimension of the grab 21, the operator can set the selector switch 91 to the calibration corresponding to the position of the trolley when the grab is removing material from the inner side of the hold and can set the increment selector switch 92 to the change in trolley position which he deems appropriate. It will, of course, be understood that instead of assessing the positions required for the switches 97 and 91, the operator could manoeuvre the ore unloader under manual control to bring the grab above the diagonally opposite corner of the hold when suitable indications would be displayed by the indicators 89 and 86 and the switches 97 and 91 should be adjusted to the corresponding calibration marks. The level of the grab for digging into the material at the top of the hold will be displayed by the indicator 87 and the selector switch 93 is operated by the operator to a calibration mark corresponding to that displayed by the indicator 87. From his knowledge of the depth of the hold and the depth of material in the hold the selector switch 94 is brought by the operator to a calibration corresponding to the position required to be occupied by the grab when removing the material from the bottom of the hold, and from his knowledge of the properties of the material to be unloaded and the performance of the grab, the operator will adjust the increment selector switch 95 to a calibration mark corresponding to the increment of grab level which he deems appropriate.

Having selected the limiting positions of grab level cross traverse and long travel and the increments thereof, it is necessary for the operator to preselect the pattern desired. If, for example, it is desired that the grab should dig twice at each position, that two rows of cross traverse should be completed before a change in grab level and that four rows of cross traverse should be completed before a long travel movement, he will set switch 102 to the calibration mark TWO, switch 104 to the calibration mark TWO and the switch 106 to the calibration mark FOUR. The operator will also operate selector switch 101 to indicate the hopper, for example 99, into which material is to be discharged.

The programme has now been pre-set and after operating the selector switch 108 to the position corresponding to an automatic programme, the push button switch 109 is depressed to start the cycle. The controller 53 now provides signals to the power control 73 over leads 81 to cause drive motors 47, 54 and 56 to be operated to produce a cycle of movement of the grab and trolley. Each cycle can best be described with reference to FIGS. 6 and 7 in which the solid lines 121, 122 respectively illustrate diagrammatically two possible paths of the grab from within the hold to a discharge position above a hopper, and the path of the grab from the discharge position to within the hold. Other possible paths are illustrated by the similarly shaped broken lines.

In FIG. 6 the path of the grab is indicated by line 121. The grab is initially at a level denoted by line H1. Motor 56 is operated to wind ropes 58 on winch drum 57 and close the grab and causing it dig into the material. Closing of the grab is detected by an increased load on the motor 56 and this increase is detected by the power control 73 and brings about energisation of the drive motor 54 of the grab hoist 30 and disconnection of the motor 56. Ropes 58 and 31 are wound on to the drum 55 and the grab is raised. The upward progress of the grab is detected by position sensitive device 66, and when the grab has reached a predetermined level above the ship, as denoted by line H2, the level of the ship being detected by the ship level sensitive means 67, controller 53 sends a hoist accelerating signal to the power control 73 and the grab hoist is accelerated. When the grab reaches a predetermined position below the track 19, as denoted by line H3, the controller 53 in response to the grab level position sensing device 66, sends a cross traverse start signal to the power control 73 which starts motor 47 of the cross traverse drive 27. The trolley commences to move landward with the grab continuing to be hoisted. When the grab reaches a level denoted by line H4 which is at a predetermined distance below the track 19, the controller 53, in response to signals from the position sensing device 66, sends a slow down signal to power control 73 to reduce the speed of the motor 54. When the grab reaches the level denoted by line H5 the controller 53 sends a slow down check signal to the power control 73 and when the grab reaches its uppermost level denoted by line H6, the controller 53 sends a grab hoist stop signal to power control 73 to stop grab hoist winch 30. The grab is now at its uppermost level and the trolley continues landward.

It is advisable to provide an interlock between the grab hoist and the cross traverse in order to prevent the trolley being cross traversed landward beyond a given point unless the grab has been hoisted above a given level. If the trolley reaches a position denoted by line XTI1 before the grab has been hoisted above a level denoted by line HLI the controller 53 stops the cross traverse drive until the grab has been hoisted above a level denoted by the line HLI.

The slowing down and stopping of the trolley and the opening of the grab are brought about by the controller 53 in response to signals from the cross traverse position sensing device 51. When the trolley reaches the position denoted by line XT1, the controller 53 sends a slow down signal to the power control 73 to reduce the speed of the motor 47. When the trolley reaches the position denoted by line XT2, the controller sends down a slow down check signal to the power control 73. When the trolley reaches the position denoted by line XT3 the controller 53 sends a grab open signal to the power control 73 which then energizes the motor 56 of the grab closing winch 37 to unwind the rope 58 from the drum 57 and permit the grab to open. The grab is now over the hopper 99 and material commences to be discharged from the grab. When the trolley reaches the position denoted by line XT4 a second slow down signal is sent by the controller 53 to the power control 73 to reduce the speed of the motor 37 still further and finally when the trolley reaches the position denoted by the line XT5 the controller 53 sends a cross traverse stop signal to the power control 73. Should the other hopper 100 be in use, the slow down, slow down check, grab open, second slow down, and cross traverse stop signals would be sent by the controller when the trolley has reached the positions denoted by the lines XT1A, XT2A, XT3A, XT4A, XT5A instead of at the positions denoted by lines XT1, XT2, XT3, XT4, XT5. Each of the positions XT1, XT2, XT3, XT4, XT5 and XT1A, XT2A, XT3A, XT4A, and XT5A are fixed since they are dependent solely on the position of the hopper with which they are associated.

The location of the grab in an open condition above a hopper can be regarded as the end of a cycle and should no long travel be called for at this stage, the controller 53 will send a cross traverse shipward start signal to the power control 73 to drive the trolley in a shipward direction.

Referring now to FIG. 7, the position denoted by the line XT9 is the cross traverse position of the trolley at which the grab is next required to dig material from the hold, and this position is determined by the controller 53 from the settings of the selector switches 90 and 92 in conjunction with the setting of selector switch 102. If the grab is to dig at the same cross traverse position as before, there will be no change to position XT9 but if the programme requires that the next dig is to be at an adjacent cross traverse position, the controller 53 will add the increment selected by selector switch 92 to the previous position and the position denoted by the line XT9 will effectively move landward by that increment. The positions denoted by lines XT8, XT7 and XT6 are each a predetermined distance landward from the position denoted by the line XT9 and when an increment is added to the position denoted by the line XT9, the same increment is added to reposition the positions denoted by the lines XT8, XT7 and XT6. Thus the positions of each of the lines XT6, XT7 and XT8 are a predetermined distance in advance of position of the line XT9 when viewed in the direction of shipward movement of the trolley 20. The trolley reaching the position denoted by the line XT6 is detected by the controller 53 as a result of signals received from the cross traverse position sensing device 51 and a signal is then sent to the power control 73 to cause the motor 54 of the grab hoist winch to be energised to commence lowering the grab. In like manner the trolley reaching positions denoted by the lines XT7, XT8, XT9 are detected by the controller 53 which sends to the power control 73 in sequence, a cross traverse slow down signal, a cross traverse slow down check signal and a cross traverse stop signal when the trolley is at the position denoted by the lines XT7, XT8 and XT9 respectively.

In order to avoid premature lowering of the grab an interlock is provided to cause the controller not to cause the motor 54 to commence lowering the grab until the trolley has reached a position denoted by line XTI2: this position is fixed and is not dependent on the positions denoted by the lines XT6, XT7, XT8 and XT9. In addition an interlock is provided at the position denoted by the line XTI1 and the level denoted by the line HLI to prevent the grab being lowered below the level denoted by the line HLI before the trolley has reached, in a shipward direction, the position denoted by the line XTI1.

In a similar manner to determining the point at which the cross traverse of the trolley is to be arrested, the controller 53 determines the level at which the grab hoist is to be arrested. If the grab is to be arrested at the same level as previously, the level denoted by the line L3 will be determined by the setting of the selector switch 93 but allowance will be made for any change in the ship level in accordance with signals from the ship level position sensing device 67 such that the level denoted by the line L3 is the same in relation to the ship. If, however, the programme has called for a change in level of the grab, in accordance with the setting of the selector switch 104, the controller 53 will add to the previous level the increment selected by the selector switch 95 and further take into account any alteration in the ship's level in determining the position of level denoted by the line L3 in relation to the track 19. Each of the levels denoted by lines L2 and L1 are a predetermined height above level denoted by the line L3 and should the level of line L3 change, the controller will change the levels of lines L2 and L1 in the same manner and by the same amount. When the grab reaches the level denoted by the line L1, the controller 53 sends a lower slow down signal to the power control 73 to slow down the motor 54 and when the grab reaches levels denoted by the lines L2 and L3 the controller 53 will send a lower slow down check signal and a lower stop signal respectively to the power control 73. Thereafter the controller 53 will send a grab hoist start signal to the power control 73 and the sequence of operations will be repeated as hereinbefore described.

As mentioned above, the locating of the grab above the hopper 99 or 100 can be regarded as the end of a cycle and the controller 53 includes a first counter for counting the number of cycles and initiating the adding of increments to the cross traverse position in accordance with the number of cycles preselected by the selector switch 102, the counter being reset with each addition of an increment to the cross traverse position. The completion of a row is in part determined by the trolley when moving in a shipward direction only being driven so far as the inner limit position as selected by the selector switch 91 and in part by the completion of the number of cycles at that position as selected by the selector switch 102. With the commencement of a fresh row, the controller 53 causes trolley 20 to be initially moved out by the cross traverse winch 27 to the outer limit position as determined by the selector switch 90 so that each row commences at the outer limit position of the trolley and terminates at the inner limit position of the trolley. The controller 53 includes a second counter for counting the number of rows and initiating change of grab level after the number of rows preselected by the selector switch 104; with each addition of an increment to the grab level this second counter is re-set. The controller also includes a third counter for counting the number of rows and initiating long travel movement after the number of rows preselected by the selector switch 106, the counter being re-set with each long travel movement.

At the end of the row at which the third counter, in combination with the selector switch 106, indicates that a long travel movement is required, the controller 53 sends a long travel start signal to the power control 73 to cause the apron hoisting winch 23 to be started, if necessary, to raise the apron, and thereafter to energise the drive motor 75 of the long travel drive. When the extent of long travel movement indicated by the long travel position sensing device 77 corresponds to the increment pre-selected by the selector switch 98, the controller 53 sends a long travel stop signal to the power control 73 to bring about stopping of the motor 75 and the re-operation of the apron hoist winch 23 to lower the apron, if it should have been raised. The controller 53 thereafter sends the cross traverse start signal to the power control 73 to bring about the sequence of operations as previously described.

If desired the controller 53 can be arranged to arrest the lowering of the grab at the same level as at the end of the row preceding the long travel movement or at a level higher by one or more increments of grab level in accordance with the flowing properties of the material to be unloaded.

The completion of the preselected automatic programme is denoted by the completion of the number of rows preselected by the switch 106 after the ore unloader has been moved by the long travel drive motor 75 into the limit position determined by the selector switch 91. Any material still remaining in the hold can then be removed by operating the ore unloader under manual control. For this purpose the operator will operate selector switch 108 to the manual control position and then utilize the push button operated switches of FIG. 5 for further operation of the ore unloader.

Each or any of the position sensing devices 51, 66, 67, 77 may comprise a series of position switches operated mechanically for example by screw and nut mechanism. The position switches themselves may be displaceable relatively to an operating member by which they are engaged and such displacement can be equivalent to the increment of cross traverse, grab level, or long travel. By way of example one arrangement of switches to provide the position sensing device 51 responsive to the cross traverse position is illustrated diagrammatically in FIG. 8. A group 130 of four switches 131, 132, 133, 134, each corresponding to one of the positions of the trolley denoted by the lines XT9, XT8, XT7, XT6 may be assembled to form a group of position switches in fixed spatial relationship relatively to one another and displaceable as a group along a line parallel to the line of movement of a common operating member 135 forming part of or connected to a screw and nut mechanism driven by drum 49; such displacement can be effected, for example, by a reversible step by step drive means 136 and a screw and nut mechanism 137 and the extent of such displacement could correspond to the increment selected by switch 92: the group as a unit may serve as operating member for a pair of co-operating individually displaceable position switches 138, 139 corresponding to the outer and inner limit positions respectively, and each movable along a line parallel to said line of movement into positions determined by the settings of the associated selector switch 90 or 91, such movement being effected either directly or indirectly through servo-mechanisms or correspondence devices 140, 141 and screw and nut mechanisms 142, 143; with two further fixed groups 144, 145 of five position switches, one group corresponding to positions denoted by the lines XT1, XT2, XT3, XT4, XT5 and the other to the positions denoted by the lines XT1A, XT2A, XT3A, XT4A, XT5A for operation by the common operating member 135, and two position switches 146, 147 corresponding to the interlock positions denoted by the lines XTI1 and XTI2 respectively, all the required signals can be derived for controlling the slowing down and stopping of the cross traverse drive motor and the starting of the grab closing winch to open the grab and the starting of the grab hoist winch to lower the grab.

A similar arrangement may be utilized for the position sensing device 66 responsive to the grab level and is illustrated diagrammatically in FIG. 9. A group of five switches 150, 151, 152, 153, 154 each corresponding respectively to one of the levels of the grab denoted by the lines L1, L2, L3 and H1 (both L3 and H1 will normally be the same) H2, H3, may be assembled to form a group of position switches in fixed spatial relationship relatively to one another upon a mounting 155 which is displaceable along a line parallel to the line of movement of a common operating member 156 forming part of or connected to a screw and nut mechanism driven by the drum 60: the location of such group along such line is dependent partly upon the desired level of the grab in relationship to the ship and partly upon the level of the ship in relationship to the track and the necessary displacements of such group can be effected by a first reversible step by step drive means 157 and a screw and nut mechanism 158 driving a carrier 159 to effect displacement to the extent corresponding to the increment selected by switch 95, together with a second reversible step by step drive means 160 and screw and nut mechanism 161 on the carrier 159 for displacing the mounting 155 relatively to the carrier, to effect displacement to an extent corresponding to change in the ship level as detected by device 67 in response to rotation of the drum 64. A limit switch 162 actuated by the screw and nut mechanism 161 is provided for the purpose of centering the mounting 155 relatively to the carrier 159 during initial setting up prior to the commencement of a programme. The screw and nut mechanism 158 or the carrier 159 serves as operating member for a pair of co-operating individually displaceable position switches 163, 164, corresponding to the upper and lower limit levels respectively and each movable along a line parallel to the line of movement of the common operating member into positions corresponding to the settings of the associated selector switches 93 and 94, such movements being effected either directly or indirectly through servo-mechanisms or correspondence devices 165, 166 and screw and nut mechanisms 167, 168. With a further fixed group of four position switches 169, 170, 171, 172 corresponding respectively to levels denoted by the lines HL1, H4, H5, H6, for operation by the common operating member 156, all the required signals can be derived for controlling the slowing down and stopping of the grab hoist when lowering the grab, the start of the grab closing hoist to close the grab and the slowing down and stopping of the grab hoist winch when hoisting the grab. Though the switches 153, 154 are shown as forming part of the group of switches on the mounting 155 so that their position relatively to the common operating member 156 is variable in accordance with change in the level denoted by the lines H1, L3, at which the grab digs, they could be disposed in fixed position, if desired, in like manner as switches 169, 170, 171, 172.

The position sensing device 77 responsive to the long travel position could likewise comprise a fixed group of position switches located along the line of movement of a common operating member, the spacing between adjacent switches corresponding to the unit of increment of long travel selectable by the switch 98. The limit position selecting switches 96 and 97 could be arranged to render operative corresponding ones of the position switches. Since the position sensing device responsive to the ship level is only required to give signals indicative of the direction and magnitude of change of the ship level and not of the absolute level of the ship for the purpose of the controller 53, that sensing device 67 could comprise a slipping frictionally operated direction responsive switch and pulsing switch means for providing a pulse with each predetermined unit of ship level change and the signals derived therefrom would be in a form readily applicable to reversible step by step drive means 160.

It is to be understood that the invention is in no way limited to such arrangements of position sensing devices which have been described solely by way of illustration, and that other forms of position sensing devices or of position switches could readily be employed.

It is also envisaged that any or each of the position sensing devices may be in the form of a digitizer translating the position information into digital electrical signals in, for example, a multi-element binary code. Each of the selector switches 90, 91, 92, 93, 94, 95, 96, 97, 98 would then be in the form of multi-pole multi-position selector switches presenting positional information in digital form on the multi-element binary code and the controller 53 would include digital computors embodying stores or memories, adders and comparators. For example in the case of the cross traverse the initial position is determined by the selector switch 90 and this may be placed in a store: the positions corresponding to lines XT6, XT7, XT8 are each a predetermined distance in advance of the initial position denoted by the line XT9. Corresponding digital signals can each be added to the first signal in store and each placed in a further individual store. When the trolley is being driven shipward digital information signals provided by the sensing device 51 can continually be compared with the corresponding digital information in the individual stores by a series of equal to or less than comparators, each of which produces an output signal when the trolley reaches the corresponding position. For changing the position of the trolley, as denoted by the line XT9, digital signals corresponding to the increment selected by switch 92 would be added to the signals in the individual memories and the fresh signals read back into the memories. Digital signals corresponding to the fixed positions denoted by the lines XT1, XT2, XT3, XT4, XT5 could be read into a further group of individual stores and during cross traverse of the trolley in the landward direction the signals provided by the sensing device 51 would be compared with the signals in this other group of stores by a series of individual equal to or greater than comparators, each of which would provide an output signal when the trolley reached the corresponding position. The other position sensing devices could be treated in a similar manner.

Figure 3B:
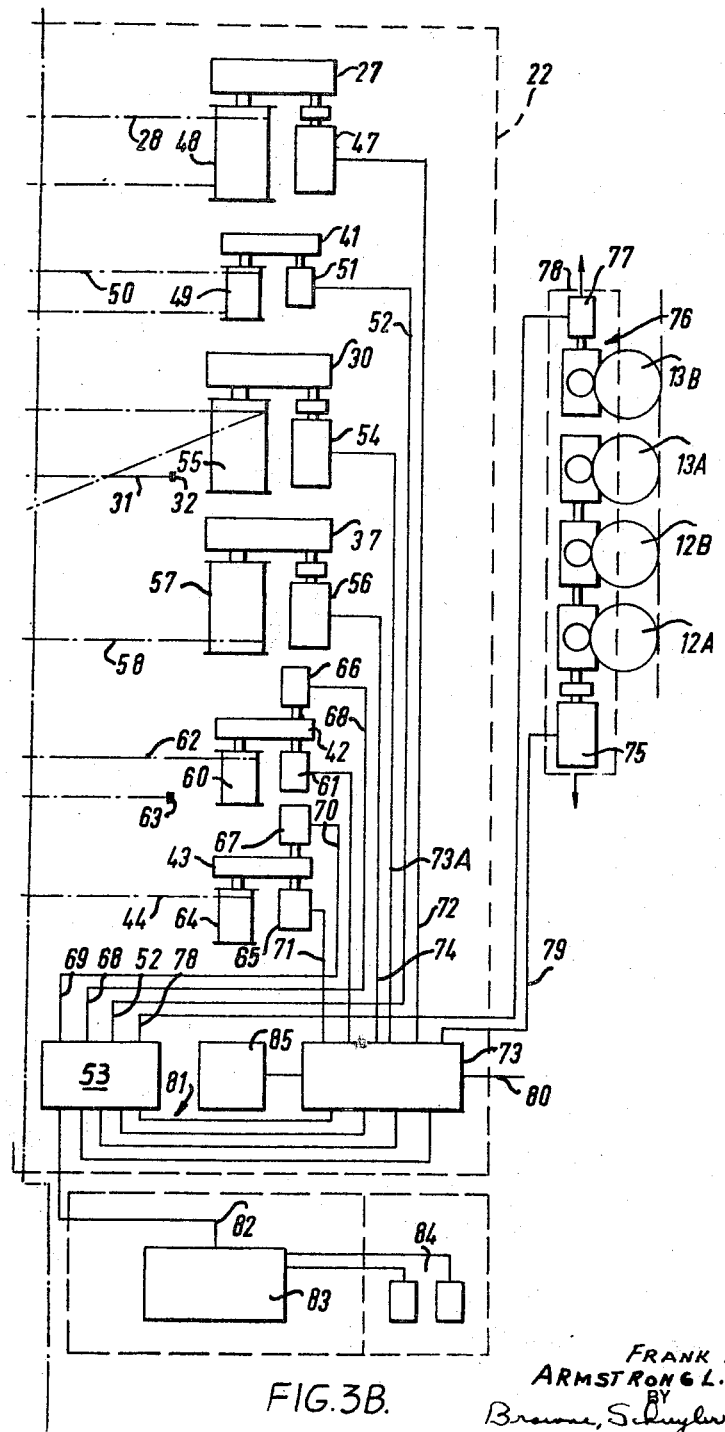

In the embodiment illustrated more especially in FIG. 3, the position sensing devices are driven independently of the power drives to the trolley and grab and this provides a measure of protection against possible inaccuracy such as might be occasioned by rope slip if the sensing devices were driven directly from the power drive winches. It is, however, possible to dispense with the drum 49, rope 50, sheave 29B and with the drum 60, rope 62, sheaves 29E, 35C, 36C, 34C, and torque motor 66, and to arrange for the sensing devices 51, 61 to be driven directly from the cross traverse winch and the grab hoist winch respectively, if provision is made for resetting or zeroing each of the sensing devices at some stage once in each cycle. If the sensing device for cross traverse is so driven it can be reset at the end of each cycle when the trolley is above a discharge hopper, for example at the position denoted by the line XT5, or XT5A and the risk of inaccurately locating the trolley at the position denoted by the line XT9 is reduced as during shipward movement the grab is empty and the load on the cross traverse winch commensurately less with attendant reduced risk of slippage between the winch drum and driving ropes or of stretch of the driving ropes. For arresting landward drive of the cross traverse winch a proximity limit switch is preferably provided and disposed for actuation by the trolley when in the discharge position thus providing positive location of the trolley at which the sensing device can be reset. In like manner if the sensing device for the grab level is driven from the grab hoist winch it can be reset when the grab is fully hoisted and for this purpose a proximity limit switch can be provided on the trolley for actuation by the grab when fully hoisted, thereby providing a positive location of the grab for arresting the hoisting by the gab hoist winch and resetting the grab level sensing device.

In the embodiment illustrated more especially in FIGS. 3, 4, 5, 6 and 7, the control of the arrest of the lowering of the grab, is dependent upon the presetting of the selector switches 93, 94, 95, the grab level sensing device 42 and the ship level sensing device 43. Considerable simplification of the control can be achieved if the grab is enabled to find its own level at which to dig into material. As the grab is lowered its weight will impose a load on the grab hoist winch and will tension the grab hoist ropes. When the grab engages and rests upon material in the ship's hold this weight load will be reduced or removed and the engagement of the grab with the material can be detected electrically by the reduction in power requirements of the grab hoist winch or by the reduction in tension of the grab hoist ropes. This latter reduction may conveniently be detected by including at least one load cell at the point 32 at which one end of the grab hoist rope or ropes are anchored. With such a load cell it is possible to dispense with the selector switches 93, 94, 95, selector switch 104, pilot lights 105, and any switching means such as 150 or other signal producing devices corresponding to the levels denoted by the line L3. The ship level sensing means 43 and associated rope 44 and sheave 29F can be omitted, as it is no longer necessary to compensate for changes in ship level since the grab will automatically cater for this in finding its own level. Since the levels denoted by the lines H2, H3 can be fixed and not be dependent upon the position of the level denoted by the line H1, the acceleration of the grab hoist during hoisting and the starting of the cross traverse drive can be initiated from the grab hoist sensing device driven from the grab hoist winch. It is, however, necessary to cater for slowing down of the grab hoist winch during lowering, that is to say at the levels denoted by the lines L1, L2 and whilst this can be done at fixed levels, as in the case of accelerating and starting the cross traverse during hoisting, it can conveniently be obtained by registering the level as detected by the grab level sensing device at which the lowering of the grab by the grab hoist winch was stopped during one cycle and during the next succeeding cycle in a row selecting levels each a predetermined height above that level for initiating the slowing down of the grab hoist winch. This can readily be achieved by utilizing as sensing devices multi-position single- or multi-pole switches in conjunction with relays, selector switches such as uni-selectors or both-way rotary selector switches or motor driven selector switches, and self-drive or pulse generating circuits, together with multi-position single- or multi-pole switches serving as the selector switches 90, 91, 92, 96, 97, 98 for presetting the inner and outer limit positions of cross traverse, the increment of cross traverse, the limits and increment of long travel.

Part of another envisaged control system as applied to the control of the grab hoist winch is illustrated in block schematic form in FIG. 10. The grab level position sensing device 61 comprises a multiposition rotary switch driven mechanically from the grab hoist winch 30; it is reversible and has sufficient positions to cover the entire vertical movement of the grab from fully hoisted to fully lowered; each position will correspond to a unit of vertical movement, for example 2 feet for a total vertical movement of about 100 feet. Prior to starting a programme the ore unloader is moved by long travel under manual control to the required position of the first cross traverse row, the trolley is positioned under manual control to a position corresponding to the required outer or inner limit position of cross traverse, and the grab is fully hoisted. After the selector switches have been set to indicate the desired outer and inner limits of cross traverse, the increment of cross traverse, the limit positions of long travel and the increment of long travel and the programme selector switches set according to the pattern or programme desired, a manual set zero switch 201 is operated. A set signal on leads 202, 203 is transmitted to the hoist slow down selectors 204 and the cross traverse start selector 205. Each of these selectors is in the form of a uni-selector or motor selector arranged for the same number of bank positions as the switch in the sensing device, for example 50, and each moves into correspondence with the switch in the sensing device 61 by, for example, hunting for a marked bank contact, and each thereafter is driven to a position a preset number of positions away from the correspondence position, each such position corresponding to a predetermined lower grab level such as denoted by the lines H3, HLI, H4, H5. The same procedure is following whenever the grab is fully hoisted in any subsequent cycles. To start operation of the ore unloader under automatic control a start auto cycle switch 206 is operated to send a start grab lower signal on lead 207 to part 73A of the power control. The grab winch now lowers the grab and when the grab engages the material, the reduction in tension in the grab hoist rope or ropes is detected by the load cell 208 which sends a stop lower signal on lead 209 to the power control part 73A and also a set signal on lead 210 to hoist accelerate selector 211. This selector is similar to the selectors 204, 205 and now moves in the same manner into correspondence with the switch in the sensing device 61 and thereafter is driven to a position a pre-set number of positions away from the correspondence position but in a direction relative thereto to correspond to a higher grab level such as denoted by the line H2. The load cell also sends a start close grab or dig signal over lead 212 to part 73B of the power control which causes the grab close winch to operate and close the grab. The part 73B of the power control then sends a start hoist grab signal on lead 213 to the part 73A which then causes the grab hoist winch to hoist the grab. When the switches in the sensing device 61 reaches a position corresponding to the position taken up by the hoist accelerate selector 211, that selector sends a hoist accelerate signal over lead 214 to the part 73A. As the grab is hoisted the switch in the sensing device 61 will reach positions corresponding to those taken up by the cross traverse start and hoist slow down selectors 205, 204 and in the appropriate sequence a cross traverse start signal will be applied to lead 214, and hoist slow down signals on lead 215 to the part 73A. When the grab is fully hoisted the proximity full hoist limit switch 216 will send a stop hoist signal to the part 73A to stop the hoist winch 30. The switch 216 also sends a reset signal on lead 218 to the selectors 204, 205 which are reset in the same manner as when set upon operation of the manual zero set switch 201.

When the cross traverse drive has moved the trolley landward into position corresponding to the line XT3 or XT3A a start open signal is sent to the part 73B on lead 219 and the winch 37 is operated to open the grab. When the grab is open an interlock signal is applied to lead 220.

When the trolley, in its subsequent shipward movement has reached a position corresponding to the line XT6, a start grab lower signal is sent on lead 221 to the part 73A which then causes the grab hoist winch 30 to lower the grab. If desired a lower slow down selector 222 may be included and set in response to a set signal on lead 223 from the load cell 208 in a manner similar to the hoist accelerate selector 211; then when the grab, during lowering, reaches a level, for example that denoted by line L1, a slow down lower signal may be sent on lead 224 to the part 73A.

A further part of such another control system, as applied to the control of the cross traverse drive winch is illustrated in block schematic form in FIG. 11. The cross traverse sensing device 51 is in the form of a reversible multi-position switch, having for example 50 positions, each corresponding to a unit of cross traverse, for example 2 feet for a total possible cross traverse movement of 100 feet. This switch is mechanically driven directly by the cross traverse drive winch 27 which is controlled by part 73C of the power control 73. Prior to starting an automatic programme the trolley is positioned under manual control above the region of one corner of the ship's hold at which the grab is first required to dig and the outer and inner cross traverse limit position selector switches 90, 91, the cross traverse increment selector switch 92, the grab cycle programme selector switch 102 and the long travel row programme selector switch 106 are set by the operator. The manual set zero switch 201 is then operated. If the trolley at that time is at the outer limit position, outer limit selector 230, which, as in the case of the selectors of FIG. 10 and other selectors in FIG. 11, may be a uni-selector or motor driven rotary selector arranged for an effective number of bank contact positions the same as the number of positions of the switch in the device 51, namely 50 for example, is driven into correspondence with the position taken up by the switch in the device 51, inner limit selector 231 is driven or pulsed to a position corresponding to that to which the inner limit selector switch 91 has been set, and the direction in which the increments of cross traverse are to be applied determined. If the trolley had been at the inner limit position, the inner limit selector 231 would be driven into correspondence with the switch in the device 51, the outer limit selector driven or pulsed into a position corresponding to that to which the outer limit selector switch 90 had been set, and the direction of application of the increments determined to be in the opposite sense. The outer and inner limit selectors serve to detect the end of a row of cross traverse positions and the position of the trolley in the first cycle of a subsequent row.

The first cycle is initiated by operation of the start auto cycle switch 206, and a signal on lead 232 causes a dig position selector 233 to be driven into a position corresponding to that of the switch in the device 51, thus recording the position of the trolley at which the grab was lowered and hoisted. When the grab, after having been lowered and closed, is hoisted to a predetermined level a cross traverse start landward signal is received on lead 214 from the grab hoist control and applied to the part 73C of the power control to start the winch 27. This signal is also applied to the dig position selector and in all subsequent cycles has the same effect as a signal on lead 232. As the trolley approaches and reaches the discharge position a series of proximity limit switches 234, 235, 236, 237 and 238 are operated in sequence to send respectively a first and a second slow signal to the part 73C over leads 239 and 240, a grab open signal on lead 219 to the grab hoist control, a third slow down signal on lead 241, and finally a stop signal on lead 242. This marks the end of a cycle and limit switch 238 sends a signal on lead 243 to a cycle counter 244 which in conjunction with the grab cycle programme switch 102 determines whether an increment of cross traverse is to be introduced in the next cycle. A signal from limit switch 238 on lead 245 causes each of a lower grab selector 246, a first slow down selector 247, a second slow down selector 248, and a stop selector 249 to be driven into positions corresponding with the then position of the switch in the device 51. A signal from limit switch 238 on lead 250 now starts the dig position selector 233 which had registered the position of the trolley at which the grab had been lowered and closed to step until it is in correspondence with the switch in the device 51: the number of steps will correspond to the distance travelled by the trolley when traversed into the discharge position and the selector 233 sends a corresponding number of pulses over lead 251 to the stop selector 249, which steps accordingly into a position corresponding to the position of the switch in the device 51 at which the trolley should be stopped on its next shipward movement if the grab were to dig at the same cross traverse position.

If the programme should now call for the introduction of an increment in the cross traverse, a pulser 252 sends to stop selector 249 over lead 253 a number of pulses corresponding to the setting of the increment selector switch 92 and cause the stop selector 249 to move to a new position. Each of the selectors 246, 247, 248 is now driven into a position related to the position of the stop selector 249 by a predetermined number of positions so as to correspond to the positions of the switch in the device 51, denoted by the lines XT6, XT7, XT8 on the landward side of the position denoted by the line XT9 to which the stop selector 249 corresponds. If no increment is called for the selectors 246, 247, 248 are driven after the pulsing of the stop selector 249.

Provided that a grab open signal has been received on lead 220 from the grab hoist control, the part 73C of the power control starts the winch 27 to drive the trolley in a shipward direction. As the switch in the device 51 reaches in sequence, positions corresponding to the positions of the selectors 246, 247, 248 and 249, respectively, a start grab lower signal is sent to the grab hoist control on lead 221, and a first slow down signal on lead 254 to the part 73C of the power control, a second slow down signal on lead 255, and a stop signal on lead 256. After lowering, closing, and part hoisting the grab a cross traverse start landward signal is received on lead 214 and the sequence of operation is repeated.

At the start of each cycle when the stop selector 233 has been positioned, its position is transmitted over lead 257 to an end of row switch 258 which compares it with the settings of the outer and inner limit selectors 230, 231 to determine whether the setting of the stop selector 233 corresponds to a limit position in row. If so, on receipt of a signal on lead 259 from the cycle counter 244 indicating that the preselected number of cycles has been completed at that position, an end of row signal is sent on lead 260 to row counter 261, and to a start new row switch 262 which over lead 263 causes the stop selector 249 to be driven to a position corresponding to the other limit position of a row as registered in the appropriate outer or inner limit selector 230 or 231. Should the row counter 260 determine, in conjunction with the long travel row programme selector switch 106, that an increment of long travel is now called for, a long travel start signal is sent on lead 264 to the long travel control and the driving of the stop selector 249 is held up until the long travel is completed and a corresponding signal given on lead 265.

Selectors and switches for giving interlock signals corresponding to the position denoted by the lines XT11 and XT12 can be provided, but for the sake of simplicity have not been illustrated in FIG. 11.

The long travel control is considerably simpler than either the grab hoist control or the cross traverse control since it is merely required to mark the end limits of long travel and to mark intermediate stopping positions such that the ore unloader is moved each time by a selected increment from one end limit position in a direction towards the other end limit position and to detect when that other end limit position has been reached.

Though the present invention has been described with reference to ore unloaders, it is not to be understood as being restricted thereto. The invention is readily applicable to unloaders, to bridges, to cranes capable of handling and transferring any material which can be substantially automatically picked up and released. For example, with magnetic material an electromagnet could be utilized in place of a grab.

We claim:

1. A control system for automatically operating a material handling device, such as an ore unloader, for unloading material from a ship's hold, having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, limit control means responsive to the cross traverse position means for arresting the cross traverse drive means in the shipward direction, and programme control means responsive to said limit selector switch means and to said cyclic control means and to said increment selector switch means for controlling said limit control means to automatically determine a succession of positions of the trolley at which said cross traverse drive means is arrested during shipward movement of the trolley whereby to enable the grab to dig material automatically a preselected number of times at each of the positions so determined between said inner and outer limit positions.

2. A control system for automatically operating a material handling device, such as an ore unloader for unloading material from a ship's hold, having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, switch means for selecting a grab cycle programme cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, limit control means responsive to the cross traverse position means for arresting the cross traverse drive means in the shipward direction, and programme control means responsive to said limit selector switch means and to said grab cycle programme selecting switch means and to said cyclic control means and to said increment selector switch means for controlling said limit control means to automatically determine a succession of positions of the trolley at which said cross traverse drive means is arrested during shipward movement of the trolley to enable the grab to dig material automatically at each of the positions so determined between said inner and outer limit positions a number of times as selected by said grab cycle programme switch means.

3. A control system for automatically operating a material handling device, such as an ore unloader for unloading material from a ship's hold, having a supporting structure, long travel drive means on said supporting structure, a trolley-supporting track on said support structure, a trolley displaceable along said track, a grab suspended from said trolley, a first hoist on said support structure for hoisting and lowering said grab, a second hoist on said support structure for closing and opening said grab, a cross traverse drive on said support structure for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, long travel position means responsive to the long travel of the unloader, selector switch means for selecting limits of long travel, increment selector switch means for selecting increments of long travel, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, limit control means responsive to the cross traverse position means for arresting the cross traverse drive means in the shipward direction, and programme control means responsive to said limit selector switch means and to said cyclic control means and to said increment selector switch means for controlling said limit control means to automatically determine a succession of positions of the trolley at which said cross traverse drive means is arrested during shipward movement of the trolley whereby to enable the grab to dig material automatically a preselected number of times at each of the positions so determined between said inner and outer limit positions and long travel control means responsive to said long travel limit selector switch means and to said long travel increment selector switch means and to said programme control means and to said long travel position means for initiating and arresting operation of the long travel drive means automatically after each predetermined number of cycles to move the ore unloader through the selected increment to a new long travel position.

4. A control system for automatically operating a material handling device, such as an ore unloader for unloading material from a ship's hold, having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, switch means for selecting a grab cycle programme, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, limit control means responsive to the cross traverse position means for arresting the cross traverse drive means in the shipward direction, lowering limit control means for automatically arresting the first hoist in the grab lowering direction, and programme control means responsive to said limit selector switch means and to said grab cycle programme selecting switch means and to said cyclic control means and to said increment selector switch means for controlling said limit control means to automatically determine a succession of positions of the trolley at which said cross traverse drive means is arrested during shipward movement of the trolley to enable the grab to dig material automatically at each of the positions so determined between said inner and outer limit positions, a number of times as selected by said grab cycle programme switch means.

5. A control system for automatically operating a material handling device, such as an ore unloader for unloading material from a ship's hold having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, grab level position means responsive to the level of the grab relatively to the trolley supporting track, selector switch means for selecting high and low level lowering limit position of the grab relatively to the track, increment selector switch means for selecting increments of lowering level of the grab, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, cross traverse limit control means responsive to the cross traverse position means for arresting the cross traverse drive means in the shipward direction, and programme control means responsive to said cross traverse limit selector switches and to said cyclic control means and to said cross traverse increment selector switch means for controlling said cross traverse limit control means to automatically determine a succession of positions at which said cross traverse drive means is arrested during shipward movement of the trolley, and grab lower limit control means responsive to grab level position means for arresting the first hoist when lowering the grab, said programme control means being also responsive to said grab level lowering limit selector switch means and to said cyclic control means and to said grab lowering level increment selector switch means for controlling said grab lower limit control means to automatically determine a succession of levels of the grab at which said first hoist is arrested during lowering of the grab whereby to enable the grab to dig material automatically a predetermined number of times at each of the levels so determined between said high and low level limit positions at each of the trolley positions so determined between said inner and outer limit positions in a preselected programme.

6. A control system according to claim 5 in which said cross traverse limit control means comprises a position switch operating member movable along a given path, means for driving said operating member in conformity with movement of the trolley along said track, a first group of position switches associated with the positions of said trolley on said track when approaching and at said discharge station, and disposed in corresponding positions along said given path, a second group of position switches associated with the position of said trolley on said track when aproaching and at said so determined positions, means responsive to said programme control means for moving said second group of position switches along said given path into correspondence with the position determined by said programme control means.

7. A control system according to claim 6 including a third position switch and a fourth position switch, a second position switch operating member for operating said third and fourth position switches and connected to said second group of position switches for movement along said given path, and means responsive to said cross traverse inner and outer limit position selector switches for moving said third and fourth position switches along said given path into positions corresponding to said inner and outer limit positions.

8. A control system according to claim 5 in which said grab level limit control means comprises a position switch operating member movable along a prescribed path, means for moving said operating member along said path in conformity with the level of the grab relatively to said track, a first group of position switches associated with the level of the grab when approaching and at its full hoisted position beneath the trolley and disposed at corresponding positions along said prescribed path, a second group of position switches displaceable along said prescribed path and associated with the level of said grab when approaching and at said so determined position, means responsive to said programme control means for moving said second group of switches along said prescribed path into correspondence with the positions determined by said programme control means.

9. A control system according to claim 8 including a third position switch and a fourth position switch, a second position switch operating member for operating said third and fourth position switches and connected to said second group of position switches for movement along said prescribed path, and means responsive to said grab high and low level limit position selector switches for moving said third and fourth position switches along said prescribed path into positions corresponding to said high and low level limit positions.

10. A control system according to claim 9, including ship level position means responsive to changes in level of the ship relatively to the track, and in which said grab level limit control means includes a mounting carrying said second group of position switches, a carrier displaceable along said prescribed path by said first-mentioned moving means, said mounting being displaceably mounted on said carrier for movement along said prescribed path, and means on said mounting and responsive to said ship level position means for moving said carrier relatively to said mounting in conformity with changes in ship level.

11. A control system according to claim 10 in which said grab level limit control means includes a fifth position switch on said mounting, a third position switch operating member connected to said carrier for actuating said fifth position switch when said carrier is substantially at the mid-position of its travel relatively to said mounting.

12. A control system according to claim 5 including ship level position means responsive to the level of the ship relatively to the track, said programme means being also responsive to said ship level position means in determining said succession of levels of the grab at which said first hoist is arrested during lowering of the grab.

13. A control system for automatically operating a material handling device, such as an ore unloader for unloading material from a ship's hold, having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, said cyclic control means including means responsive to detection of a reduction in grab weight load occasioned by the grab during lowering engaging said material for arresting grab lowering by said first hoist, limit control means responsive to the cross traverse position means for arresting the cross traverse drive means in the shipward direction, and programme control means responsive to said limit selector switch means and to said cyclic control means and to said increment selector switch means for controlling said limit control means to automatically determine a succession of positions of arrest of the trolley at which said cross traverse drive means is arrested during shipward movement of the trolley whereby to enable the grab to dig material automatically a preselected number of times at each of the positions so determined between said inner and outer positions.

14. A control system according to claim 13 in which said means responsive to reduction in grab weight load is a load cell.

15. A control system for automatically operating a material handling device, such as an ore unloader for unloading material from a ship's hold, having a supporting structure, long travel drive means on said supporting structure, a trolley-supporting track on said support structure, a trolley displaceable along said track, a grab suspended from said trolley, a first hoist on said support structure for hoisting and lowering said grab, a second hoist on said support structure for closing and opening said grab, a cross traverse drive on said support structure for moving the trolley along the trolley-supporting truck in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, long travel position means responsive to the long travel of the unloader, selector switch means for selecting limits of long travel, increment selector switch means for selecting increments of long travel, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, said cyclic control means including means responsive to detection of a reduction in grab weight load occasioned by the grab during lowering engaging said material for arresting grab lowering by said first hoist, limit control means responsive to the cross traverse position means for arresting the cross traverse drive means in the shipward direction, and programme control means responsive to said limit selector switch means and to said cyclic control means and to said increment selector switch means for controlling said limit control means to automatically determine a succession of positions of the trolley at which said cross traverse drive means is arrested during shipward movement of the trolley whereby to enable the grab to dig material automatically a preselected number of times at each of the positions so determined between said inner and outer limit positions, and long travel control means responsive to said long travel limit selector switch means and to said long travel increment selector switch means and to said programme control means and to said long travel position means for initiating and arresting operation of the long travel drive means automatically after each predetermined number of cycles to move the ore unloader through the selected increment to a new long travel position.

16. A control system for automatically operating a material handling device, such as an ore unloader for unloading material from a ship's hold, having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, switch means for selecting a grab cycle programme, grab level position means responsive to the level of the grab relatively to the trolley-supporting track, means responsive to reduction in grab weight load occasioned by the grab during lowering engaging said material, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, first limit control means responsive to the cross traverse position means for arresting the cross traverse drive means in the shipward direction, second limit control means responsive to said load reduction detection device for arresting said first hoist during a lowering operation, and programme control means responsive to said limit selector switch means and to said grab cycle programme selecting switch means and to said cyclic control means and to said increment selector switch means for controlling said first limit control means to automatically determine a succession of positions of the trolley at which said cross traverse drive means is arrested during shipward movement of the trolley to enable the grab to dig material automatically at each of the positions so determined between said inner and outer limit positions, a number of times as selected by said grab cycle programme switch means, said cyclic control means including a hoist accelerate selector responsive to signals from said load reduction detection device and said grab level position means for registering the position at which the grab during lowering engaged the material, and thereafter registering a position corresponding to a predetermined level thereabove, and a grab hoist winch power control means responsive to signals from said hoist accelerator selector indicating correspondence of the positions of the hoist accelerator selector and said grab level position means, and said load reduction detection device, and a grab close winch power control means responsive to signals from said load reduction detection device and an open grab proximity limit switch means.

17. A control system for automatically operating a material handling device, such as an ore unloader for unloading material from a ship's hold, having a trolley-supporting track, a trolley displaceable along said track, a grab suspended from said trolley, a first hoist for hoisting and lowering said grab, a second hoist for closing and opening said grab, a cross traverse drive for moving the trolley along the trolley-supporting track in a shipward direction to a position above a hold of a ship and in a landward direction to a discharge position, comprising cross traverse position means responsive to the position of the trolley along the trolley supporting track, selector switch means for selecting inner and outer limit positions of the trolley in a shipward direction, increment selector switch means for selecting increments of cross traverse for the trolley, switch means for selecting a grab cycle programme, grab level position means responsive to the level of the grab relatively to the trolley-supporting track, means responsive to reduction in grab weight load occasioned by the grab during lowering engaging said material, cyclic control means for operating said first and second hoists and said cross traverse drive in a succession of cycles, each cycle comprising operating said second hoist to close the grab, operating said first hoist to hoist the grab, operating the cross traverse drive to move the trolley in a landward direction to bring the trolley to said discharge position, operating said second hoist to open the grab, operating the cross traverse drive to move the trolley in a shipward direction into a position above the hold of the ship, and operating the first hoist to lower the grab, first limit control means responsive to the cross traverse position means for arresting the cross traverse drive means in the shipward direction, second limit control means responsive to said load reduction detection device for arresting said first hoist during a lowering operation, and programme control means responsive to said limit selector switch means and to said grab cycle programme selecting switch means and to said cyclic control means and to said increment selector switch means for controlling said first limit control means to automatically determine a succession of positions of the trolley at which said cross traverse drive means is arrested during shipward movement of the trolley to enable the grab to dig material automatically at each of the positions so determined between said inner and outer limit positions, a number of times as selected by said grab cycle programme switch means, said control means including a first slow down selector responsive to signals from said cross traverse position means and a second slow down selector, said second slow down selector being responsive to signals from said cross traverse position means and a stop selector, said first and second slow down selectors registering positions corresponding to predetermined distances landward of the dig position and said stop selector registering a position corresponding to the dig position, said stop selector being responsive to signals from said cross traverse position means, a dig position selector, a start new row control means, an increment pulser and a stop proximity limit switch means, said start new row control means being responsive to signals from an end of row switch means and along travel complete indicating means, said end of row switch means being responsive to signals from said stop selector, a cycle counter, and inner and outer limit selectors, and a lower grab selector responsive to signals from said cross traverse position means and said first slow down selector, and a cross traverse drive winch power control means responsive to signals from said first slow down selector, said second slow down selector, said stop selector, a cross traverse start selector, and a grab close winch power control means.

References Cited by the Examiner

UNITED STATES PATENTS

| | | | |
|---|---|---|---|
| 1,284,837 | 11/1918 | Watson | 212—81 |
| 2,072,747 | 3/1937 | Freese | 212—132 |
| 2,082,393 | 6/1937 | Hallenbeck | 212—132 |
| 2,097,909 | 11/1937 | Atz | 214—16 X |
| 2,671,567 | 3/1954 | Reedy | 212—81 |
| 2,896,795 | 7/1959 | Kersting | 214—14 X |
| 2,988,237 | 6/1961 | Devol | 214—11 |
| 3,049,247 | 8/1962 | Lemelson | 214—11 X |

GERALD M. FORLENZA, *Primary Examiner.*